T866034

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 30, 1969

866 O.G. 1439

818,819

REMOVAL OF CARBONACEOUS IMPURITY FROM AMMONIATED PHOSPHORIC ACID SOLUTIONS

Wendell D. Burch, 1705 N. 7th,
Ponca City, Okla. 74601

Filed Apr. 23, 1969. Published Sept. 30, 1969
Int. Cl. C05b *7/00, 11/16*
U.S. Cl. 71—34
No Drawing. 6 Pages Specification

Black carbonaceous impurity is settled from ammoniated phosphoric or superphosphoric acid fertilizer solution by admixing with said solution a minor amount of finely divided phosphate rock as a settling aid. The sedimentation results in a clear supernatant liquid product layer, which may be adapted to fertilizer use, and a lower settled sludge layer, highly concentrated in carbonaceous impurities, that may be blended into a suspension fertilizer. The supernatant and sludge layers may be separated by simple decantation, filtration or centrifugation.